United States Patent [19]

Rosenfeld

[11] Patent Number: 4,583,165
[45] Date of Patent: Apr. 15, 1986

[54] APPARATUS AND METHOD FOR CONTROLLING STORAGE ACCESS IN A MULTILEVEL STORAGE SYSTEM

[75] Inventor: Philip L. Rosenfeld, Briarcliff Manor, N.Y.

[73] Assignee: International Business Machines Corporation, Armonk, N.Y.

[21] Appl. No.: 394,053

[22] Filed: Jun. 30, 1982

[51] Int. Cl.$^4$ .............................................. G06F 9/38
[52] U.S. Cl. .................................................. 364/200
[58] Field of Search .................. 364/200 MS File

[56] References Cited

U.S. PATENT DOCUMENTS

| | | | |
|---|---|---|---|
| 3,670,307 | 6/1972 | Arnold et al. | 364/200 |
| 3,878,513 | 4/1975 | Werner | 364/200 |
| 3,898,624 | 8/1975 | Tobias | 364/200 |
| 4,313,158 | 1/1982 | Porter et al. | 364/200 |
| 4,408,275 | 10/1983 | Kubo et al. | 364/200 |
| 4,442,488 | 4/1984 | Hall | 364/200 |
| 4,489,378 | 12/1984 | Dixon et al. | 364/200 |

Primary Examiner—Thomas M. Heckler
Attorney, Agent, or Firm—George E. Clark; Jack M. Arnold

[57] ABSTRACT

In a digital data processing system including an Instruction Unit, an Execute Unit, and a multilevel Processor Storage System including a cache memory, additional apparatus is included referred to as a Load Control Block Address Unit for implementing a load control block address instruction which permits prefetching of data from main memory into cache simultaneous with execution of a sequence of instructions in a linked list wherein information determining starting address of a next block in the linked list is stored at a location in the current block at a fixed offset from the beginning of the block.

8 Claims, 16 Drawing Figures

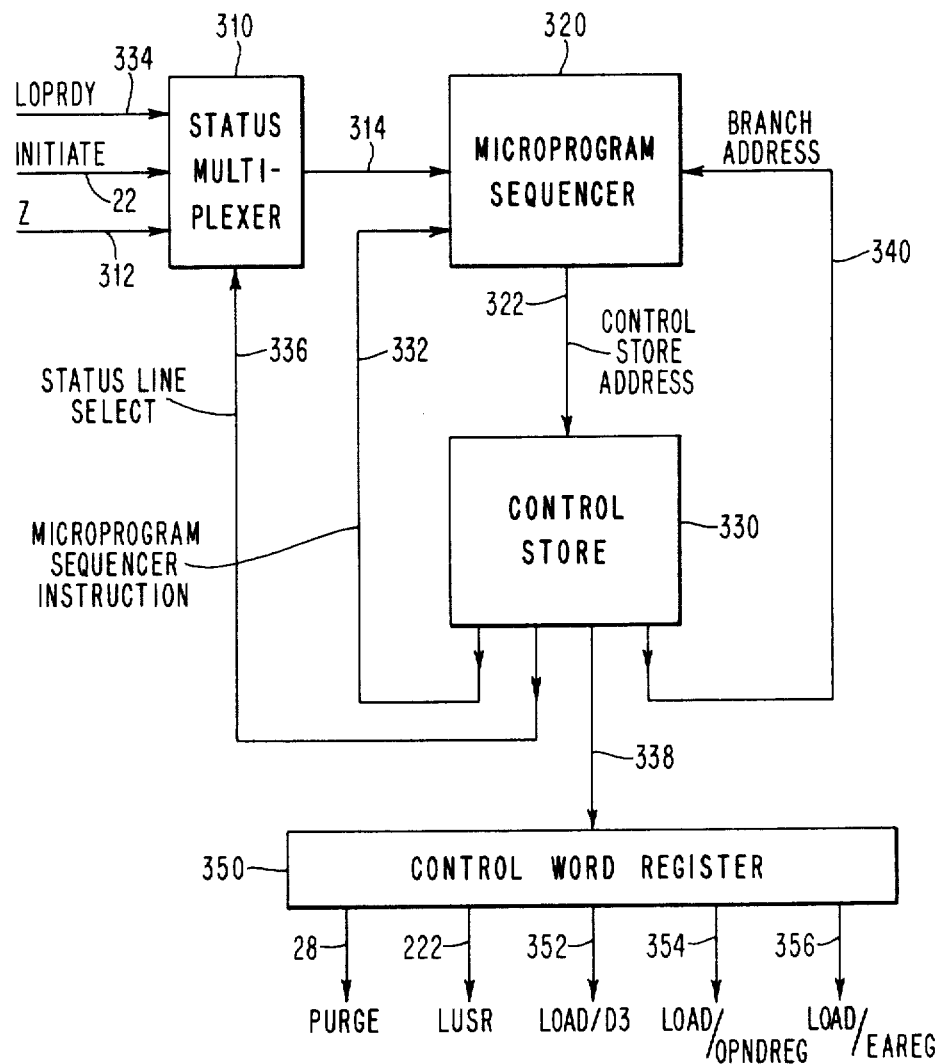
FIG. 2.1

FIG. 2.2
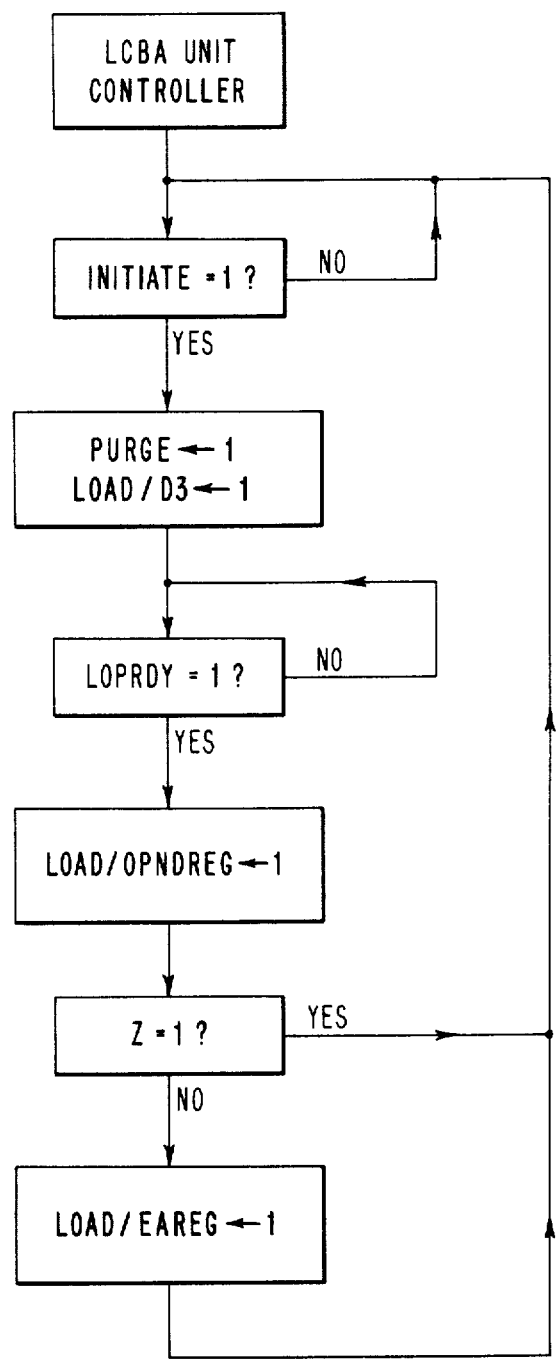

| ADDRESS | CONTENTS |
|---|---|
| 0 | |
| A(G) = CONTENTS B2 | |
| | G |
| A(G) + D2 | A(C1) |
| | |
| A(C3) | C3 |
| A(C3) + D3 | A(C4) |
| | |
| A(C1) | C1 |
| A(C1) + D3 | A(C2) |
| | |
| A(C4) | C4 |
| A(C4) + D3 | φ |
| | |
| A(C2) | C2 |
| A(C2) + D3 | A(C3) |

APPARATUS AND METHOD FOR CONTROLLING STORAGE ACCESS IN A MULTILEVEL STORAGE SYSTEM

DESCRIPTION

1. Technical Field

The present invention relates to digital data processing systems and more particularly to digital data processing systems having a multilevel storage system including a main memory and a high speed cache memory.

2. Prior Art

High performance digital data processing systems generally employ storage systems consisting of more than one level to improve performance. Typically, there are two levels, a main memory which provides large scale storage but is relatively slow, and a cache which is relatively small but much faster than main memory in providing requested data to the central processing unit (CPU). Since the cache is small, it cannot contain all of the data stored in main memory. Cache memories are generally managed dynamically according to a least recently used (LRU) algorithm. When data requested is not in the cache, the processor must go to main memory to retreive the data. Further execution of the instruction is delayed until the address miss is resolved. In many high performance data processing systems, the penalty for an address miss can be as long as the time it takes to execute several instructions.

There are many data processing systems known in the prior art which employ prefetch schemes with multilevel storage hierarchies having cache memories.

Among these prior art systems which employ prefetch schemes with multilevel storage hierarchies having cache memories are the following patented systems:

U.S. Pat. No. 4,157,587 shows a high speed buffer memory system with word prefetch in which apparatus is provided for prefetching information in a next address location or in a plurality of successively higher address locations in main memory. The patent does not show prefetching information from main memory based upon a control block address generated from operand data and a predetermined offset.

U.S. Pat. No. 4,156,905 sets forth a method and apparatus for improving access speed in a random access memory in which a prefetch register is utilized for receiving and temporarily storing the first address portion representing the location of a group of words stored in memory and where the first address portion is subsequently utilized to access memory to retrieve a group of words to be stored in memory output registers, further including a second address portion utilized to select words contained in the output registers of the memory. The patent does not show prefetching information from main memory based upon a control block address generated from operand data and a predetermined offset.

U.S. Pat. No. 4,086,629 sets forth a hierarchial data store with lookahead action in which is set forth a scheme for prefetching sequential data blocks in advance of their requirement, that is, if data is currently being accessed from block N, then block N +1 is prefetched at the same time.

Although the patent teaches prefetching of a next control block, the patent does not show prefetching of the next control block based upon an offset.

U.S. Pat. No. 3,878,513 relates to method and apparatus using occupancy indications to reserve storage space for a stack in a multilevel storage system in which a register stack includes linked list of control words containing stack depth information indicating the number of stack words accumulated in executing each block. A stack history list is made up from the linked list of control words which mark the beginning of stack areas storing stacks for the different program blocks. The mark words contain a different value pointing to a proceeding mark word and indicating the depth of the preceeding stack. As each block is exited, this difference value is obtained and supplied to an address modifying means which in turn produces a pointer to a new top location of the stack extension memory.

Although the patent relates generally to hierarchial storage systems having linked lists with pointers calculated to point from one control block in a linked list to another control block in a linked list, the patent relates more particularly to control blocks which are nested and wherein the pointer in the nested control block points to a control block address in the primary control block. The patent does not teach prefetching from a following control block based upon an offset value.

U.S. Pat. No. 4,095,269 shows a data processing system having a high speed buffer memory in which data is transferred in continuous regions from the main memory to the buffer. The patent does not show a prefetch scheme wherein addresses of subsequent control blocks to be fetched are based on an offset value.

U.S. Pat. 4,056,845 shows a memory access technique in a data processing system having a main memory and a high speed cache memory wherein the cache memory has an interleaved structure which provides improved access time on fetches to cache.

The patent does not relate to prefetching of subsequent control blocks using addresses based on an offset value.

U.S. Pat. No. 3,936,804 relates to a data processing system including apparatus for utilizing a logical, record oriented move instruction. By utilizing separately maintained data field descriptors which define the attribute of the data, the move instruction is able to transfer a multitude of different data types. From a source operand the logical instruction transfers data field by field to the destination.

The patent does not relate to apparatus or method for prefetching information from a subsequent control block wherein the address of the subsequent control block is based upon an offset value.

U.S. Pat. No. 3,898,624 relates to a data processing system having a high speed buffer storage between the main storage and the CPU. The patent discusses the algorithm which prefetches the next sequential line from main storage to buffer and for replacement of existing lines in the buffer.

The patent does not relate to prefetching information from a subsequent control block from address information based on an offset value.

U.S. Pat. No. 3,670,307 describes an interstorage transfer mechanism for use in a two-level storage having a high speed buffer storage and a large capacity main storage. Storage requests can be received and serviced concurrently at a plurality of request ports in the system through the use of request stack buffers. Means are provided for choosing a target address in the high speed buffer wherein the desired data will be located. Tag indexing of the target address is updated by the interstorage transfer mechanism to reflect the new data. Means are further provided for invalidating all requests currently in transit at the time the tag is changed to insure data integrity in case the request referred to old data in the target line.

Although the patent does relate mechanisms for maintaining the validity of data in the high speed buffer memory, the patent does not relate to prefetching information from a subsequent control block based on addresses generated from a predetermined offset value.

Since none of the prior art known to the inventor of the present invention shows either means or a method for generating prefetch addresses of control blocks in a linked list based upon a predetermined offset value, new and useful means and method to achieve the desired result will be shown as embodied in the present invention.

SUMMARY OF THE INVENTION

Therefore, it is a primary object of the presen invention to improve performance in a data processing system having a multilevel memory system by including means and method for implementing a new instruction which prefetches information in a linked list wherein a next control block address is stored in a location within the current control block wherein said location is at a predetermined offset from the start address of the current control block.

It is another object of the present invention to improve performance in a data processing system having a multilevel memory system by providing apparatus to compute an address of a location storing a next control block address from a predetermined offset value and for prefetching data from the control blocks in a linked list into cache storage in parallel with the execution of other CPU instructions to eliminate system delay due to data unavailable in cache.

Accordingly, a data processing system having an Instruction Unit, an Execute Unit and a multilevel processor storage system including a cache high speed memory further includes a new unit designated herein as Load Control Block Address Unit (LCBAU) which performs the following functions:

(a) purges the routing of any outstanding LCBAU requests in a program storage unit upon the raising of an initiate line from the instruction unit resulting the decoding of an LCBA instruction;

(b) clears all address registers in the LCBAU;

(c) sets the D3 register in LCBAU to the value of D3 contained in the appropriate operand field of the LCBAU instruction;

(d) sets the operand register in the LCBAU to the value of the first operand as specified by the address information in the LCBA instruction;

(e) adds the offset value in the D3 register to the low order portion of the address value in the operand register in storing the result as an effective address in the effective address register;

(f) tests the operand register to determine if the operand is 0 (if the operand is 0, no further control block addresses are fetched and the LCBAU goes into a wait state);

(g) requests operand from the processor storage unit at the effective address last computed.

When the processor storage unit returns the data to the LCBAU from the effective address, this data which comprises the next operand is stored in the operand register and a new effective address is calculated after the operand is tested for 0. The processing of address information continues in the LCBAU until the 0 detector determines if the operand is 0 at which time no further prefetches are made by the LCBAU ($\phi$ in the field being a programmer selected protocol. If during the prefetching of a sequence of control block addresses in a linked list, a new initiate signal is received by the LCBAU from the Instruction (I) unit, all processing of the earlier LCBA instruction is immediately suspended and a purge signal is sent to the processor storage unit to purge any outstanding requests for data which were initiated by the LCBAU. Processing of the new LCBAU instruction is then commenced.

It is a feature of the present invention that processing speed in a high performance data processor including a multilevel storage system having a high speed cache is improved by a new instruction called a Load Control Block Address instruction and the apparatus for implementing the instruction to prefetch a sequence of control blocks in a linked list from main memory into cache in accordance with operand and offset information contained in the Load Control Block Address instruction.

A preferred embodiment of the present invention will be described with reference to the accompanying drawing.

BRIEF DESCRIPTION OF THE DRAWINGS

FIG. 2.1 is a block diagram showing in further detail the LCBA unit controller according to the present invention.

FIG. 2.2 is a flow chart setting forth the operation of the LCBA unit controller shown in FIG. 2.1.

DETAILED DESCRIPTION OF THE PREFERRED EMBODIMENT

Figure 1:
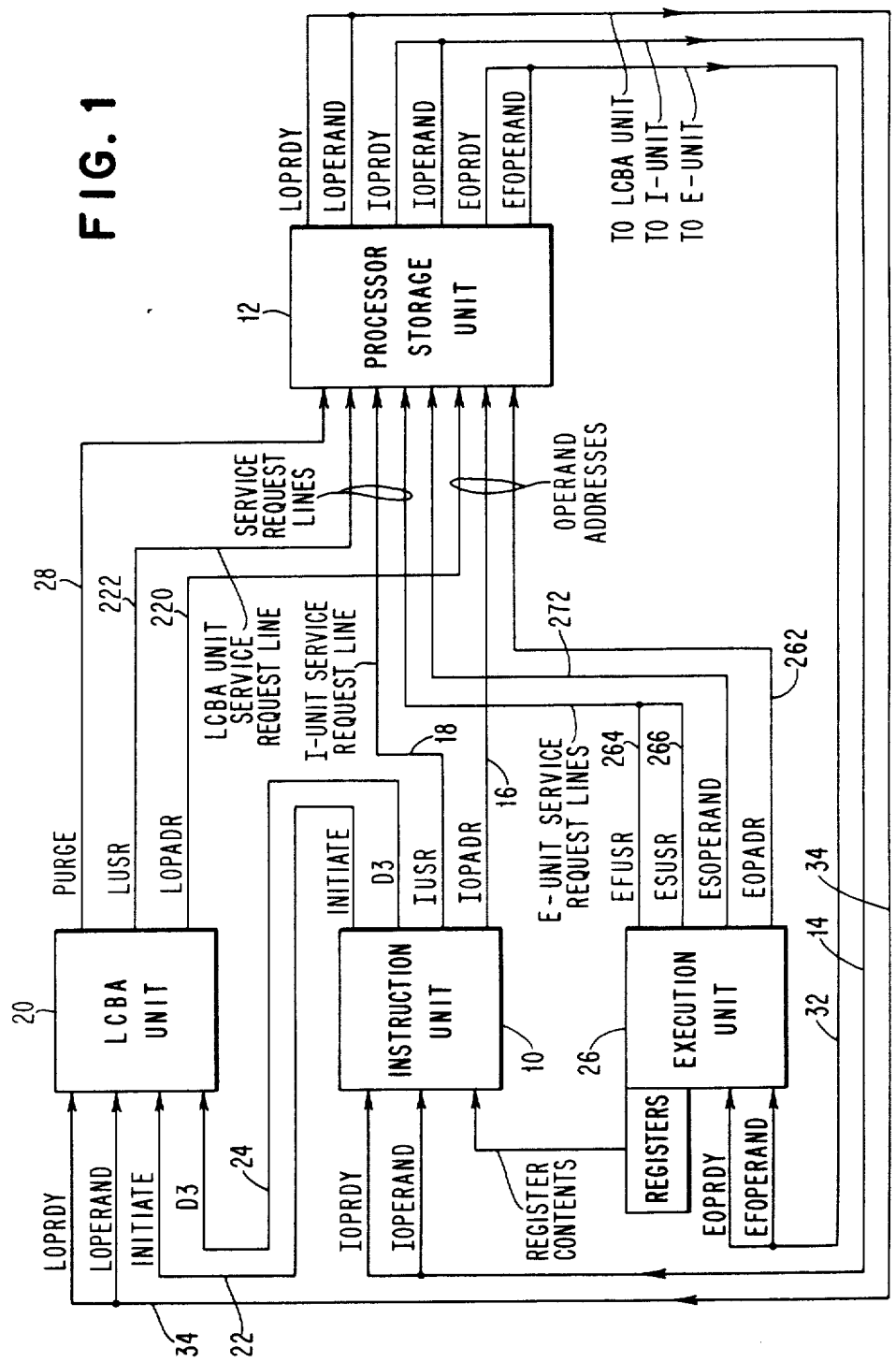
FIG. 1 is a block diagram of the major components of a high speed data processing system in accordance with the present invention.

Cache memories are used to improve the effective speed of processors by providing a small amount of high speed storage (typically 64K vs. 32M of main store). Cache contents are conventionally managed according to a demand-fetch/least recently used (LRU) replacement scheme. The present invention adds to the conventional scheme by allowing fetches to be done before the data is actually required. This is accomplished via a new pre-fetch instruction, LCBA.

The preferred embodiment of the present invention is described with reference to the IBM System/370 architecture. For example, addresses are generated from operands according to the rules found in System/370 Principles of Operation.

Further discussion of the operation of conventional cache storage systems can be found in System/370 Model 168 Theory of Operation/Diagrams Manual, (Vol. 4), Processor Storage Control Functions, (PSCF), published by IBM Corporation, copyright 1973, Form No. SY22-6934-6.

Requests can be satisfied quickly when the data is in the cache, but accessing main memory requires a much longer period of time.

Caches typically have the following geometry: Each entry in the cache consists of several bytes. This entry is called a line and in the embodiment of the present invention to be described will be considered to be 128 bytes. A portion of the reference address (bits 18-24) determine a congruence class in the cache. This hashing scheme allows a fast lookup of the cache contents. Each congruence class has multiple entries, called associative sets. Lookup in the sets is done in parallel. In this embodiment there are four entries in each congruence class.

Requesting units always request a doubleword. Bits 25-28 determine the doubleword of a line that is requested.

One of the Units will send a request to Processor Storage Unit (PSU) to fetch or store data at a given address. The request is said to be satisfied when the requested operation is complete. Data must be in the cache before a request for that data can be satisfied. In conventional (uniprocessor) systems, requests from some units, the E Unit in particular, must be satisfied in the order in which they are received. This is necessary to maintain "observable order", an architectural property of most computer systems. The present invention introduces a special unit specifically to do manipulation of data between main memory and the cache. For this type of data movement there is no requirement for "observable order." Therefore the present scheme allows requests to be satisfied out of order. In particular, a pre-fetch request that misses may be satisfied after subsequent requests that hit in the cache.

If the requested data is found in the cache, the request will be satisfied before any additional requests are accepted. If the requested data is not in the cache, the PSU will save information about the request, send the address to main memory in order to begin accessing the data, and then be available to accept additional requests. (Main memory is interleaved so that it can handle multiple requests concurrently.)

Note that conventional handshaking is superimposed on all components.

The LCBA, I- and E- units request a single doubleword.

The embodiment of processor storage assumes that access time to main memory is much slower than access time to the cache. Therefore a performance improvement can be realized by overlapping memory accesses (after a miss) with continued reference activity.

An interleaved memory allows multiple requests to be handled concurrently. After an address is delivered to a main memory bank, processor storage is free to deal with additional requests. A memory bank will transfer the cache line to a specific buffer before signalling processor storage that the line is ready. This minimizes the time required to transfer the line into the cache. Main memory is interleaved so that lines in the same congruence class fall in different banks.

A new computer instruction called Load Control Block Address (LCBA) causes the multilevel memory system to fetch identified data into the cache before required by the instruction stream. This prefetch reduces the penalty due to address missing in the cache and results in better performance.

Figure 5:
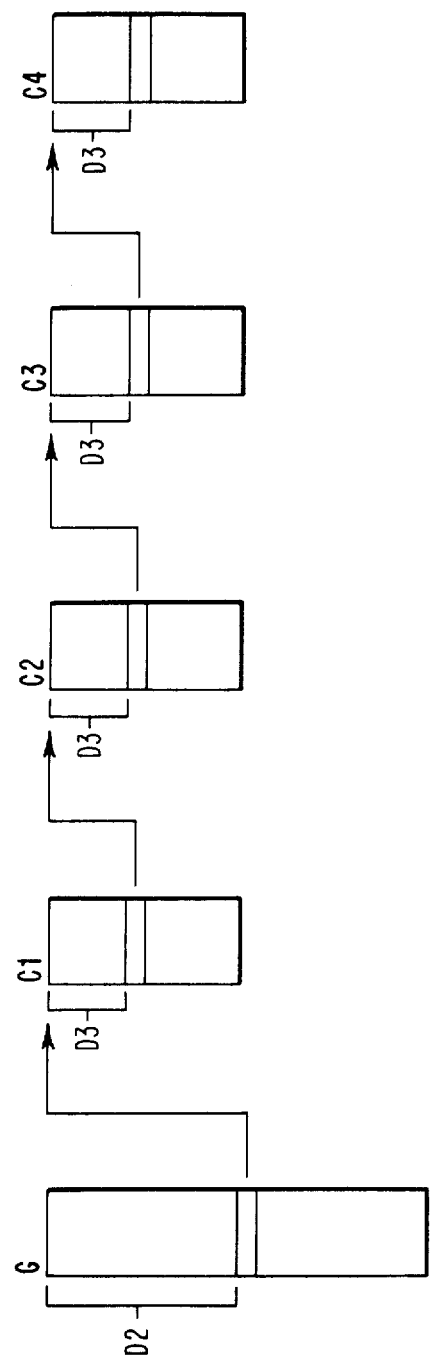
FIG. 5 is a diagram showing the logical structure of a linked list of control blocks.

LCBA instructions appear in the instruction stream just as any other instruction. The use of LCBA is restricted to programs operating in supervisor state. LCBA is intended to be used to generate references for a sequence of pointers in a linked list. FIG. 5 shows the logical structure of a typical linked list. A linked list consists of a series of related control blocks, C1, C2, etc. These blocks are not necessarily near each other physically in storage but rather the address of the next block in the list is found in the current block. The next block address is at a fixed offset, specified as D3, from the start of the block. The address of the first block is kept at a predetermined location relative to the start of a global table. A zero contained in the address at offset D3 of a particular control block indicates that the block is the final block on the linked list.

Figure 6:
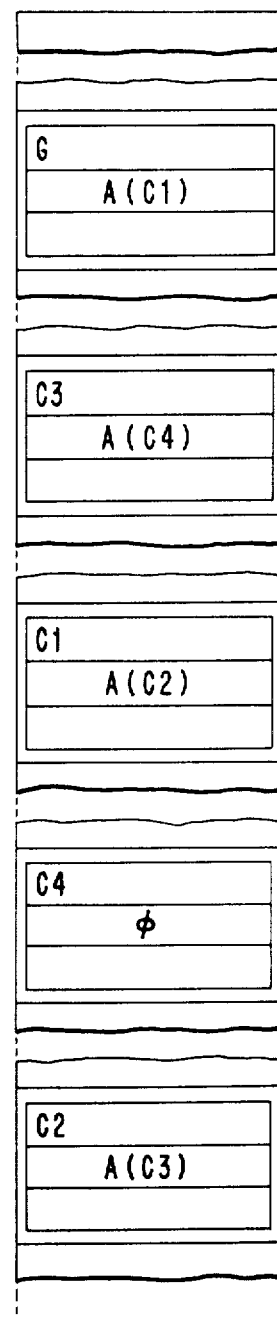
FIG. 6 is a diagram showing the physical layout of a control block in accordance with the present invention.

FIG. 6 shows how this control block linked list structure might appear physically in storage.

The LCBA instruction has the following format:

LCBA R1, D2 (B2), D3

It consists of an OP code which identifies the instruction as LCBA plus three operands. The first two operands R1 and D2 (B2) are identical to those used with the Load Instruction in System/370 architecture. That is, a register, indicated by R1 and an address location, specified as a displacement, D2, from a base register, B2. D2 (B2) is the address of the first block on the linked list. The third operand is an additional displacement, D3. D3 is the fixed offset of the start of the block that locates the next block address.

The LCBA instruction causes the data at the address specified by D2 (B2) to be placed in register R1 as is the case for the Load Instruction. LCBA then causes references for the next block addresses of the linked list.

The LCBA instruction is implemented by adding a new unit, called the LCBA unit (LCBAU), to the known system architecture. LCBAU independently generates addresses, and requests that they be pre-fetched by the Processor Storage Unit. This allows the I unit and the E unit to continue processing while the data need for future instructions is brought into cache.

Referring now to FIG. 1, a preferred embodiment of the present invention will be described.

A high performance digital data processing system according to the present invention includes an I-Unit, an E-Unit and a PS-Unit as are well known in the art, for example, as embodied in the IBM System/370 Model 168 high performance data processing system and in addition thereto a new functional unit identified herein as the Load Control Block Address Unit (LCBAU) which provides the performance enhancements and improved proficiency of the present invention.

The I-Unit 10 fetches instructions from the Processor Storage Unit 12 on line 14. The instruction fetched is then decoded in I-Unit 10 and operand addresses from the instruction are then transmitted from I-Unit 10 to PSU 12 along lines 16 for address information and lines 18 for control information or to LCBAU 20 along lines 22 for control information and 24 for operand D3 information.

Detailed description of the operation of the I-unit 10 and the E-unit 26 will not be included herein except as the operation of those functional units relates to the Load Control Block Address Unit and the Load Control Block Address instruction. The operation of I-unit 10 and E-unit 26 are well known in the art and are fully described in the system's operations manual available for the IBM System/370 Model 168 referred to above.

Load Control Block Address Instruction

If I-unit 10 decodes an LCBA instruction, the initiate LCBA line 22 is raised which acts as an interrupt to the LCBAU 20 which raises purge line 28 cancelling routing of any prior LCBAU requests in PSU 12 by gating all zeros into the LCBAU routing.

Figure 2:
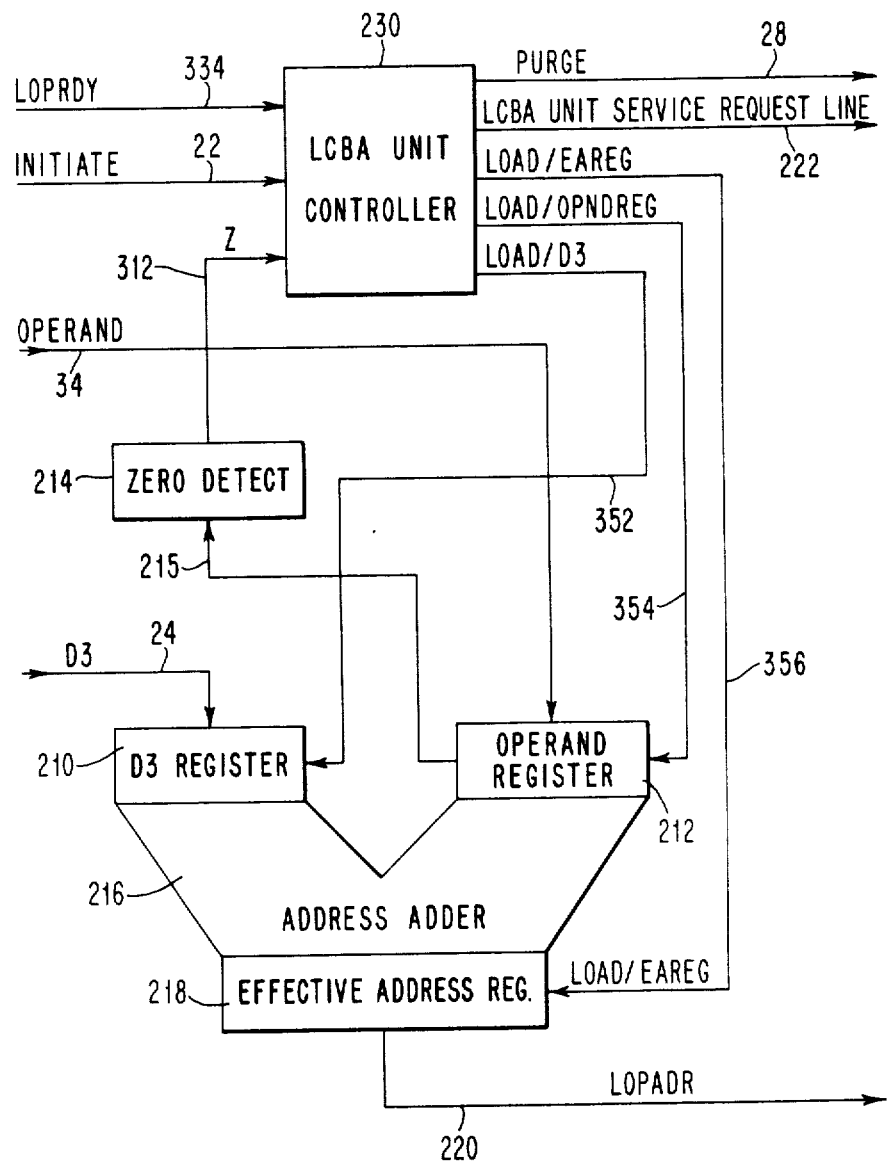
FIG. 2 is a block diagram of a Load Control Block Address Unit according to the present invention.

Referring also to FIG. 2 all address registers containing address information related to any prior LCBAU requests are cleared. The displacement field D3 is set into the D3 register 210 in the LCBAU 20. The D3 field is transmitted from the I-unit 10 to LCBAU 20 on line 24.

I-unit 10 then requests the data at the location defined by base and displacement address fields D2 (B2) from the processor storage unit 12 and sets address information D2 (B2) on operand address bus 16 and raises operand address valid line 18 to the processor storage unit 12. The data at location D2 (B2) is fetched and routed to the LCBAU 20 and the E-unit 26 where it is stored in register R1.

At this point, I-unit 10 is free to deal with other instructions while the LCBAU 20 and the PSU 12 are operating on the LCBA instruction. This provides a parallelism in the operation and prevents lockups due to cache misses.

The data from location D2 (B2) (which is an address of the top of a control block) is set into operand register 212 in LCBAU 20 concurrently with it being set into register R1 in E-unit 26. The operand information is transmitted to E-unit 26 from PSU 12 on operand bus 32 and concurrently to LCBAU 20 on operand bus 34.

The contents of operand register 212, which at this point is the operand transmitted from PSU 12 is then tested by zero detect 214 to determine if the operand is zero. If the operand is detected to be zero, this indicates that the last control block in the linked list has been accessed and no further control block address accesses should be made by LCBAU 20.

If the operand is not zero, the contents of operand register 212 and D3 register 210 are added in address adder 216 to form an effective address of the next control block, which effective address is stored in effective address register 218. The contents of D3 register 210 are added at the low order end of the address. The LCBAU (L-unit) then requests a new operand from PSU 12 by placing the effective address on operand address bus 220 and raising L-unit Service Request line 222 to PSU 12.

PSU 12 on receiving operand request fetches the data at the effective address and routes the data to LCBAU 20 on operand bus 34.

The priority of the various service requests to PSU 12 by LCBAU 20, E-unit 26 and I-unit 10 is as follows:
first priority—store to PSU from E-unit;
second priority—fetch from PSU to E-unit;
third priority—fetch from PSU to I-unit; and
last priority—LCBAU requests to PSU.

After the first pass in a linked list, the operand register 212 contains the address of the first location in a second control block (see FIG. 5) and D3 register 210 still contains displacement value D3. Since operand register 212 contains a nonzero value, a new effective control block address is obtained by adding operand register 212 contents to the displacement value in D3 register 210. The new effective address is again stored in effective address register 218 and set on operand address bus 220 to PSU 12. The process of prefetching next control block addresses by LCBAU 20 is continued until either the contents of operand register 212 are detected to be zero by zero detect 214 which indicates the end of the linked list of control blocks or until initiate line 22 is raised from I-unit 10 which purges routing for all LCBAU requests in process.

As an alternative, to improve system efficiency, if a search through a linked list results in a particular data item being found, the operation of the LCBAU can be terminated by a Branch on Data Found to a second new instruction called Load Control Block Address Purge (LCBAP) which immediately terminates all further request generation by the LCBAU and cancels routing of all outstanding requests to the PSU originated by LCBAU 20. The LCBAP instruction eliminates the need to clutter the cache with unnecessary data items which might be fetched subsequent to the data item being sought.

Prefetch schemes such as described herein reduce total penalty due to cache address misses by bringing data into cache before it is requested. To be effective, these methods require a means for allowing the processor to continue to fetch data from the cache while a miss is being resolved. A preferred apparatus and method for achieving this is described herein. A prefetch request that causes an address miss in the cache will not delay subsequent I-unit or E-unit requests. Thus, the I-unit and E-unit can continue to operate while the prefetch request is being brought into cache.

Referring now to FIGS. 2, 2.1 and 2.2, the operation of the LCBA unit will be described in greater detail. When the initiate line 22 is raised, status multiplexer 310 which is in the wait state transmits a signal to microprogram sequencer 320 on line 314 which initiates the microprogram sequence. A control store address representative of a first state in the control sequence is transmitted on bus 322 to control store 330 which then presents one or more control signals to control word register 350. A microprogram sequence instruction is also transmitted on line 332 to microprogram sequencer 320. A status line select signal is transmitted to multiplexer 310 and if appropriate, a branch address is transmitted to microprogram sequencer 320 on bus 340. In the initiate sequence, purge line 28 is raised and the load/D3 line 352 is raised which latches the D3 operand in D3 register 210. The LCBA unit controller 230 then waits for OP ready line 334 to be raised indicating that the operand is on bus 34 from the PSU 12 to LCBAU 20. When operand ready line 334 is raised, sequencer 320 sends a signal to control store 330 which causes load operand register line 354 to be raised causing the operand on bus 34 to be latched in operand register 212. The operand contained in register 212 is then transmitted to zero detect register 214 on lines 215 to determine whether the last control block in the linked list has been found. If zero in the operand register 212 is detected line 312 is raised which puts microprogram sequencer 320 into the wait state to await a new LCBA initiate sequence. If the zero detect register does not detect all zeros in the operand, control store raises line 356 which is the load effective address register line which places the effective address register 218 contents on bus 220 for transmission to Processor Storage Unit 12.

Figure 7A:
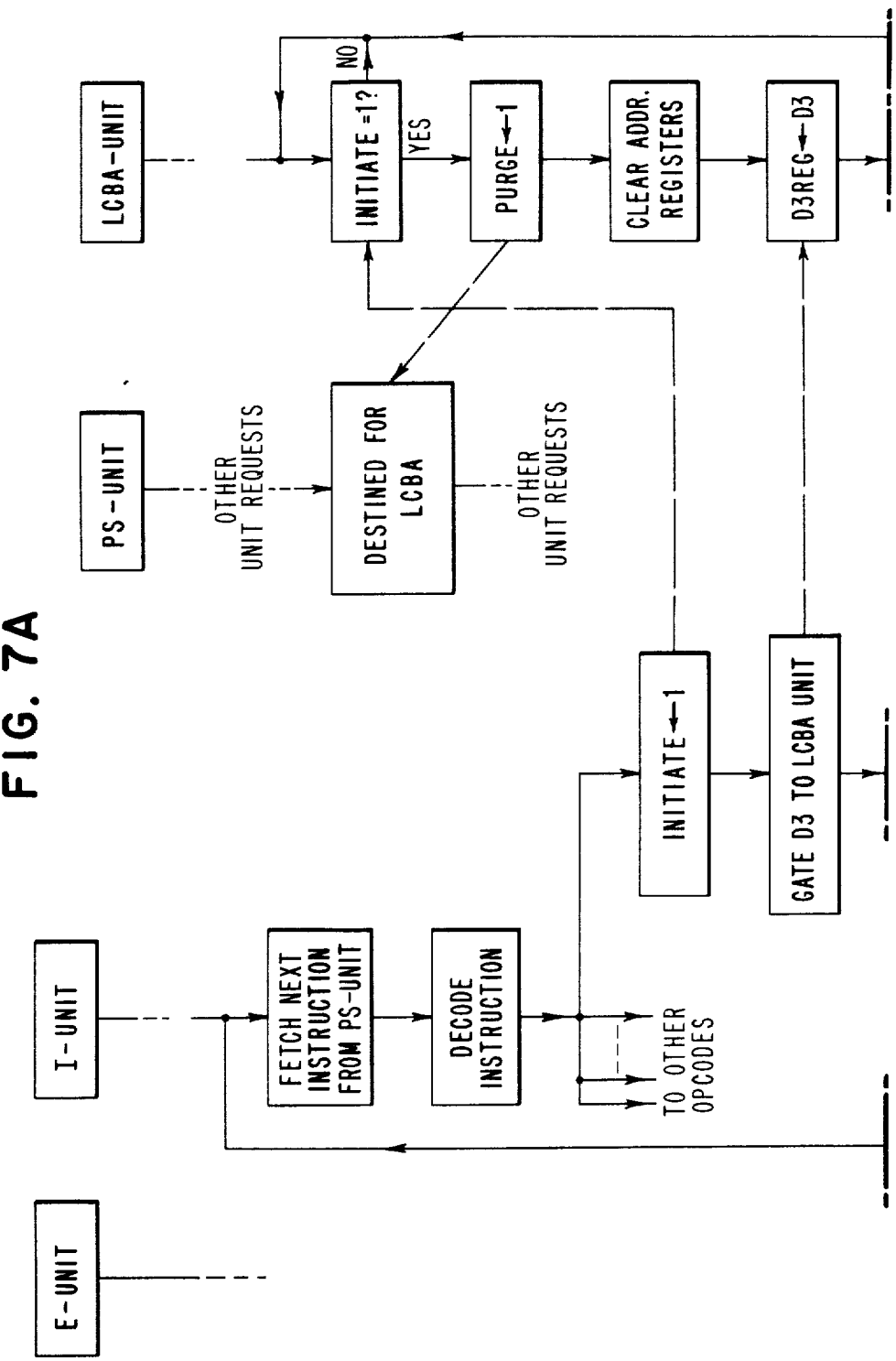
FIG. 7, which is comprised of FIGS. 7A and 7B and viewed with FIG. 7A on the top and FIG. 7A on the bottom, is a flow chart setting forth the interrelated operation of the LCBAU according to the present invention relative to the other major functional units of the system.
Figure 7B:
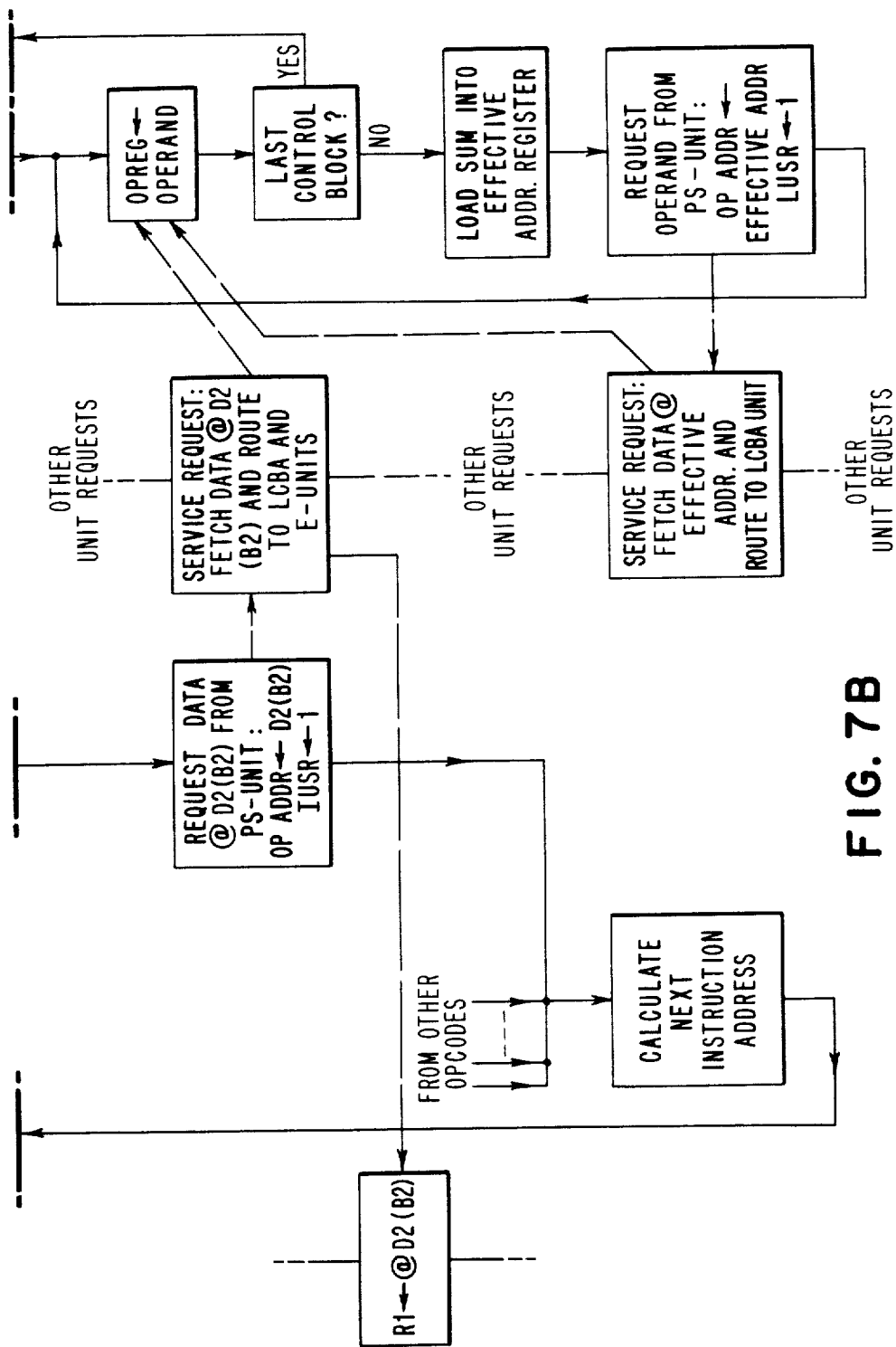
Figure 8A:
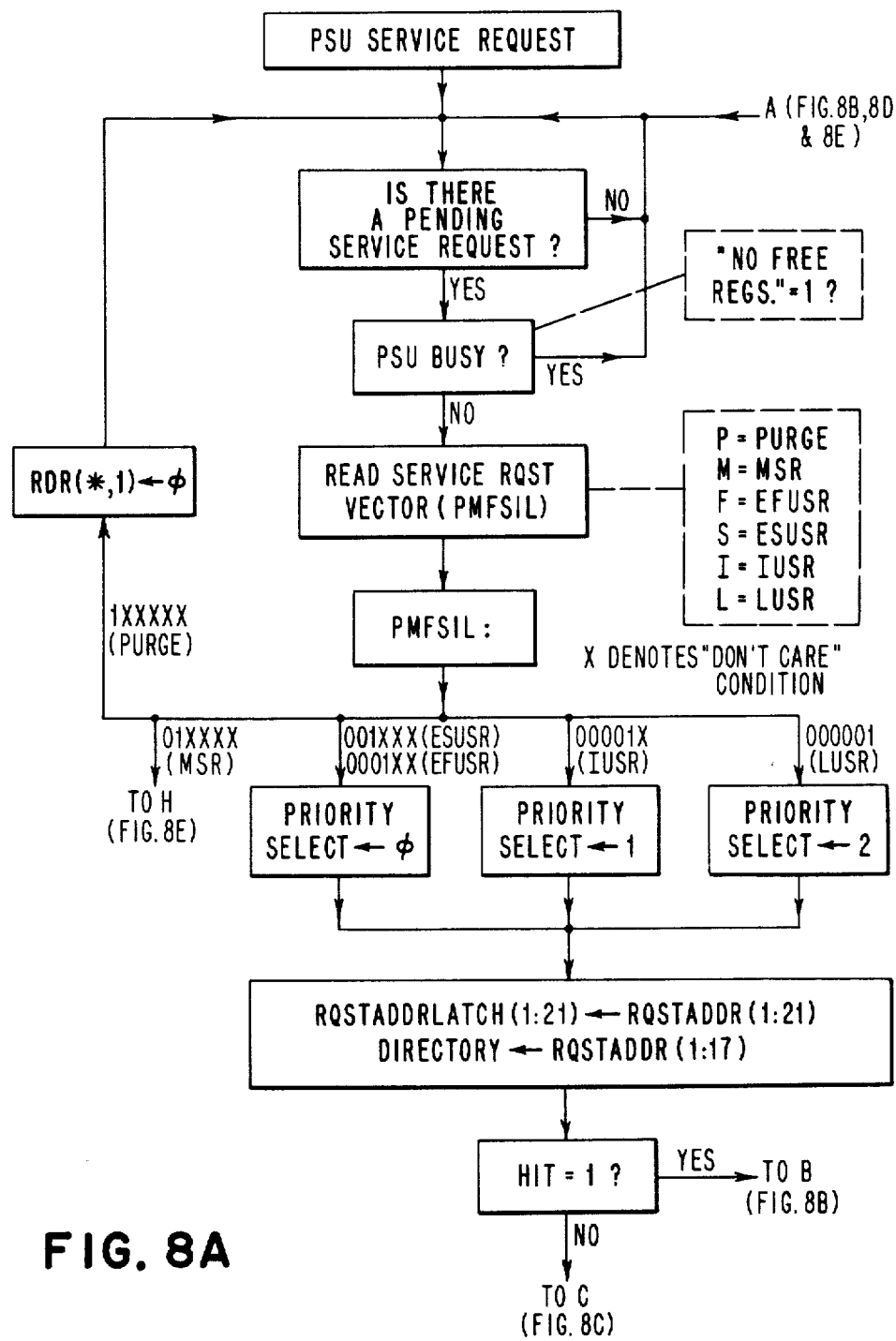
FIG. 8, which is comprised of FIGS. 8A-8E, is a flow chart which sets forth in detail the operation of the Processor Storage Unit for servicing storage requests as related to the LCBA of the present invention.
Figure 8B:
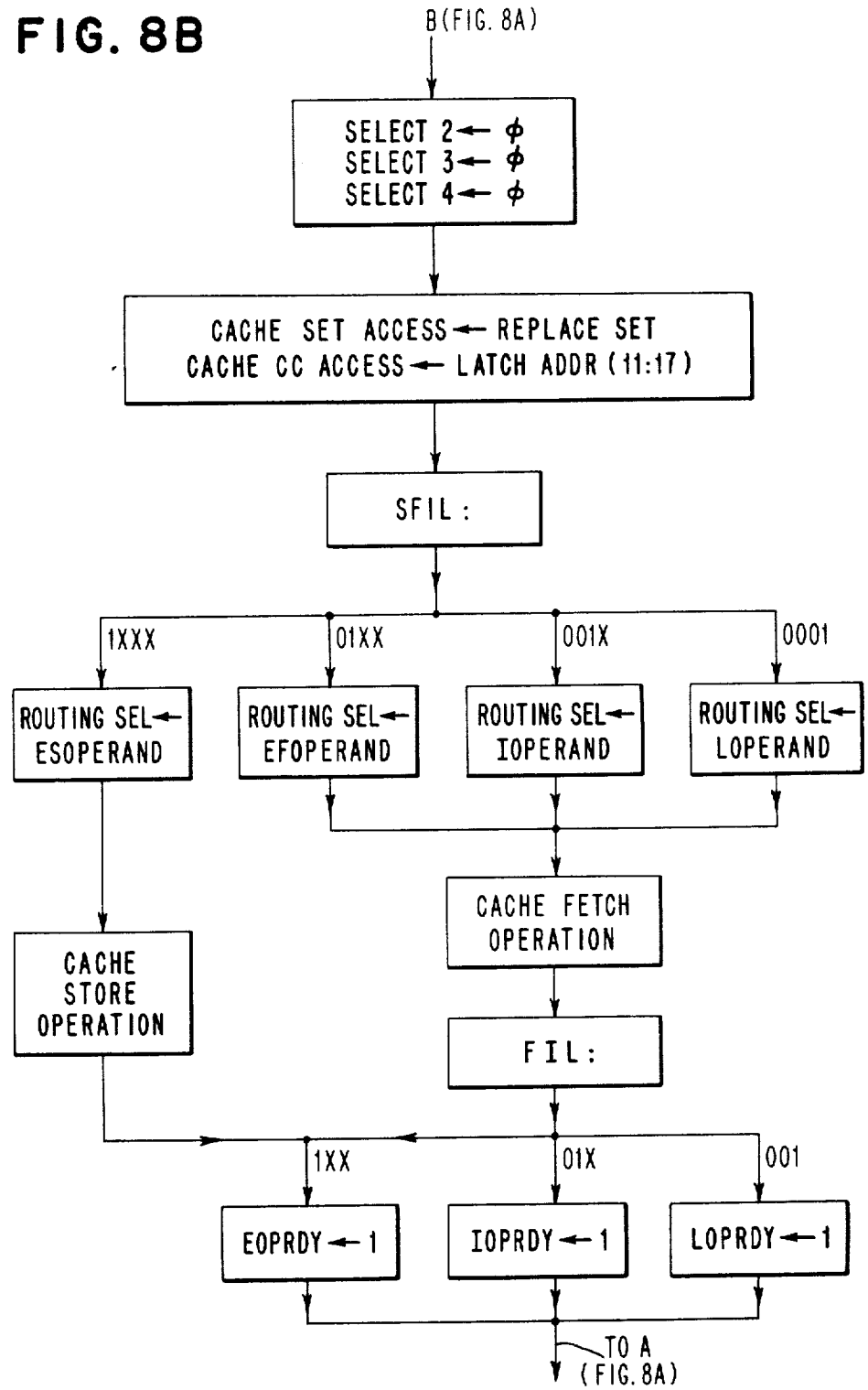
Figure 8C:
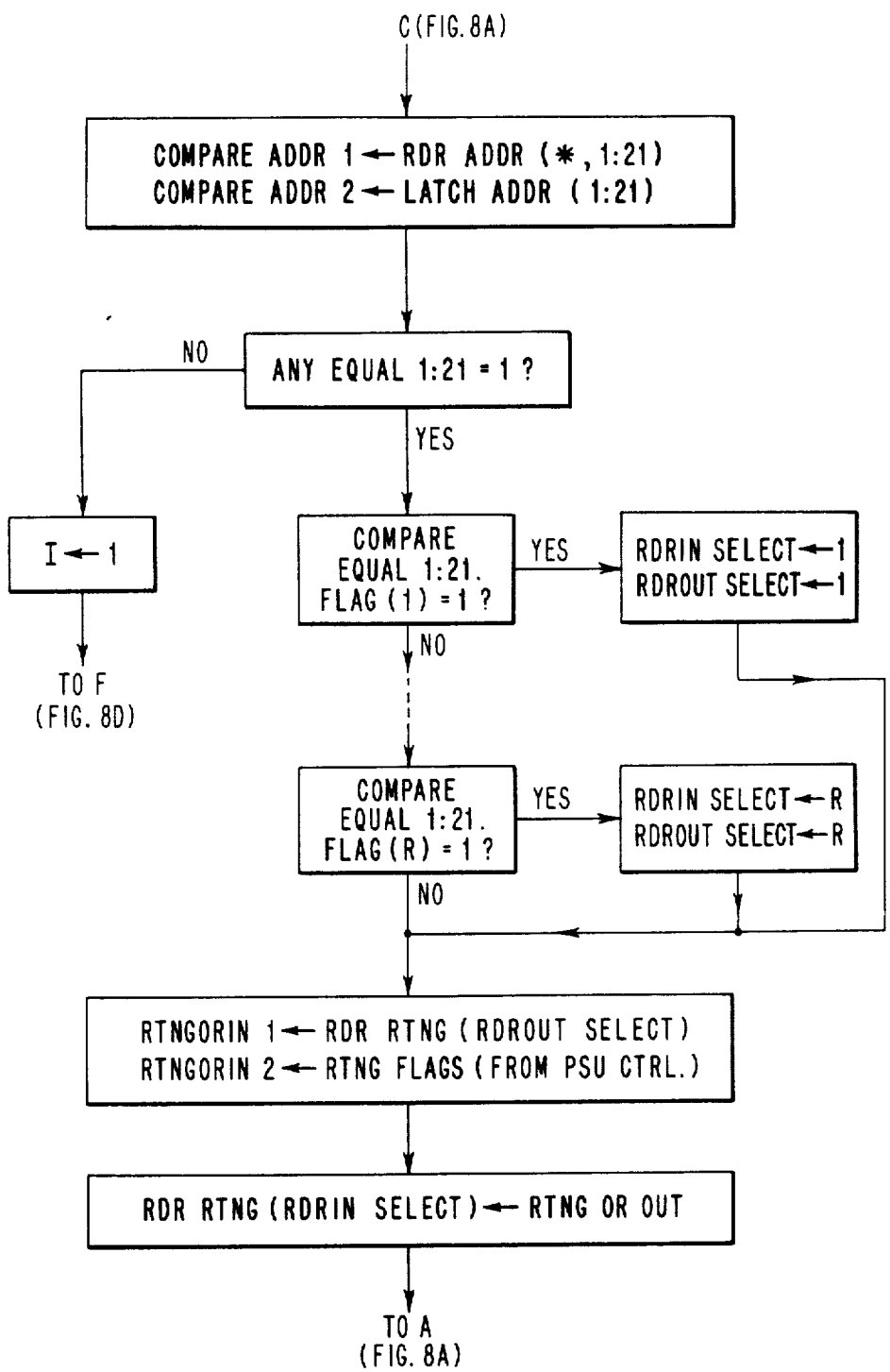
Figure 8D:
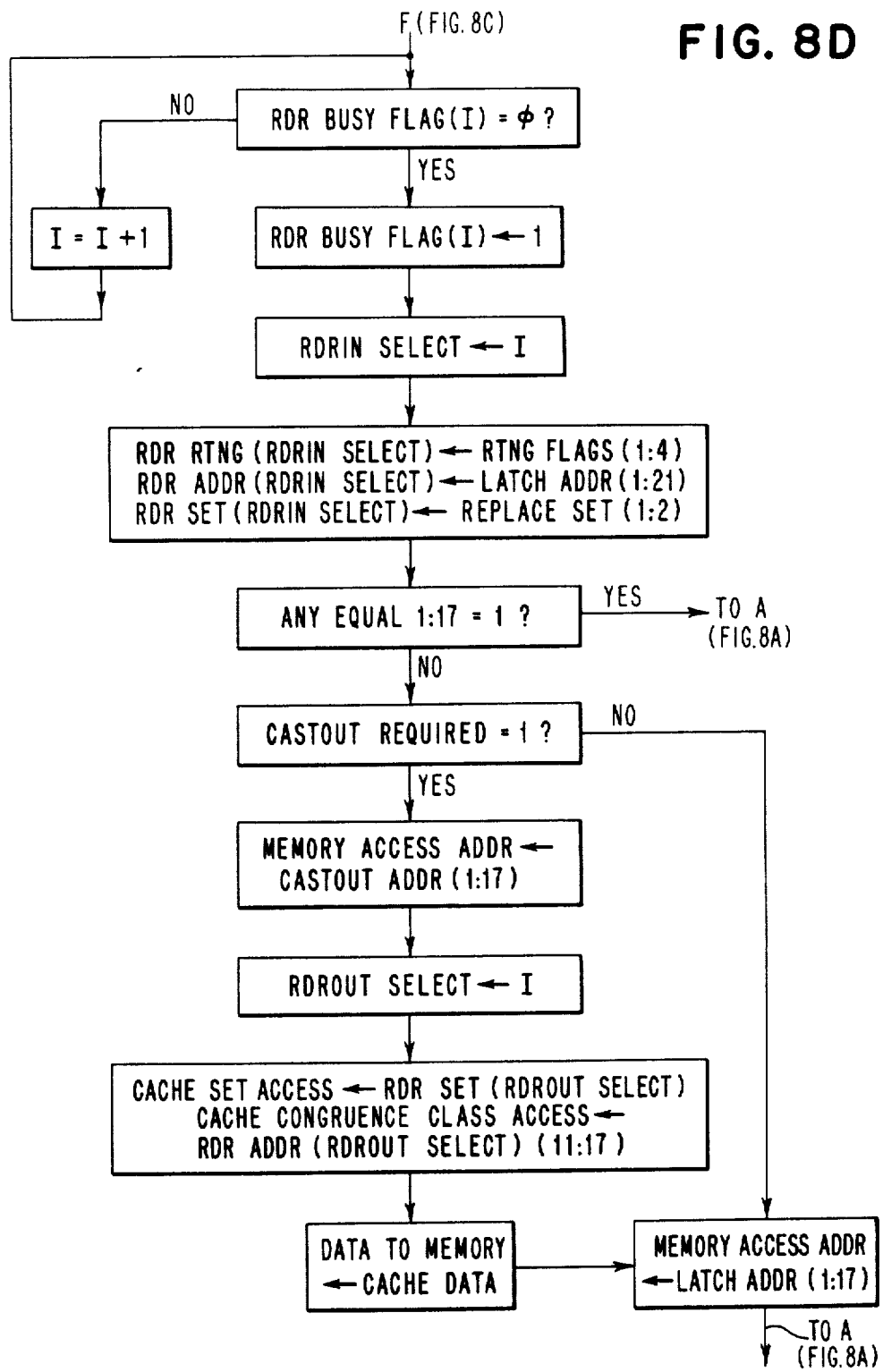
Figure 8E:
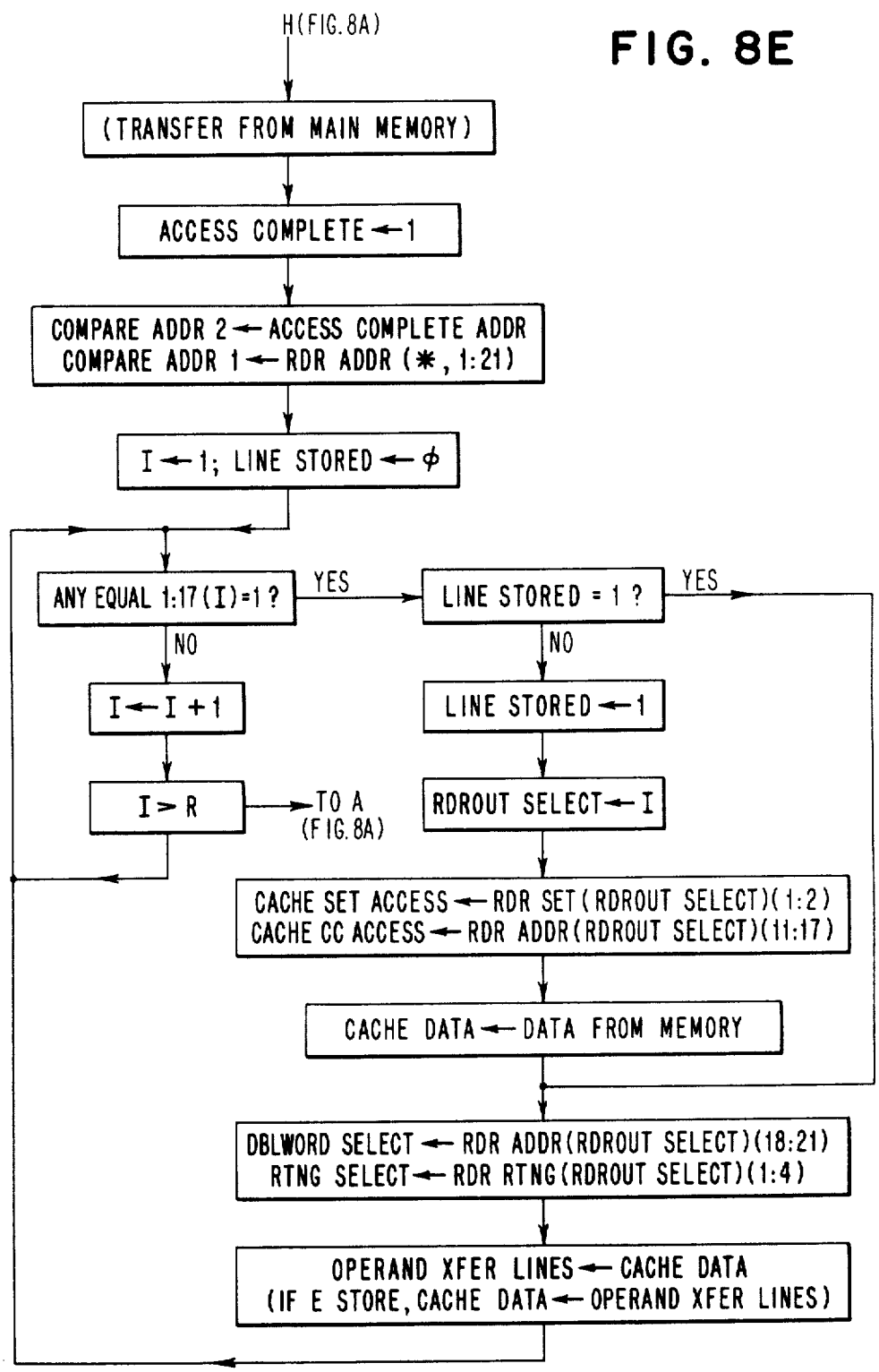

FIG. 7 is a flow chart which describes the LCBAU operation described above.

Figure 3A:
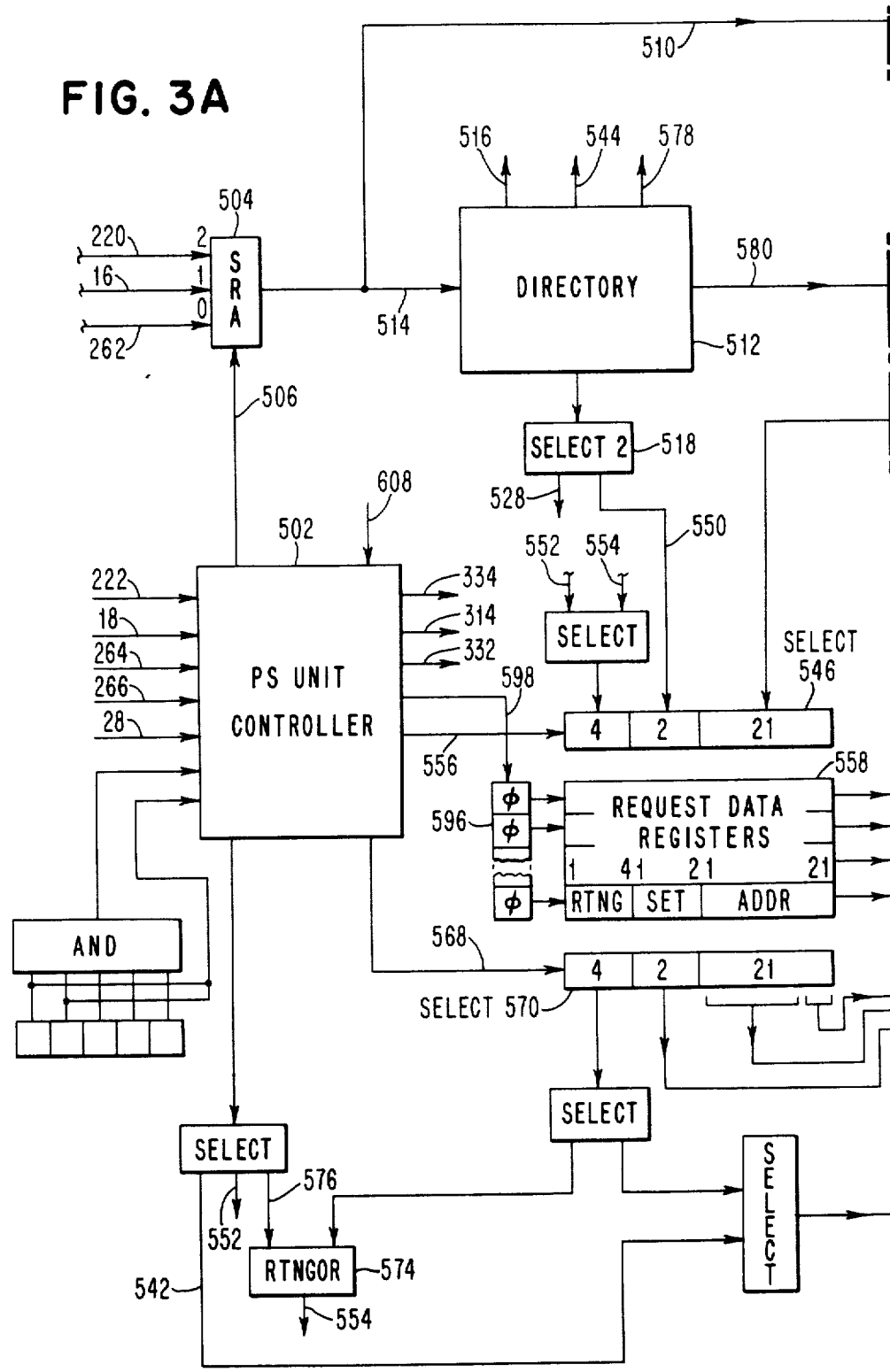
FIG. 3, which includes FIGS. 3A and 3B and is viewed with FIG. 3A on the left and FIG. 3B on the right, is a block diagram of a Processor Storage Unit, including cache, according to the present invention.
Figure 3B:
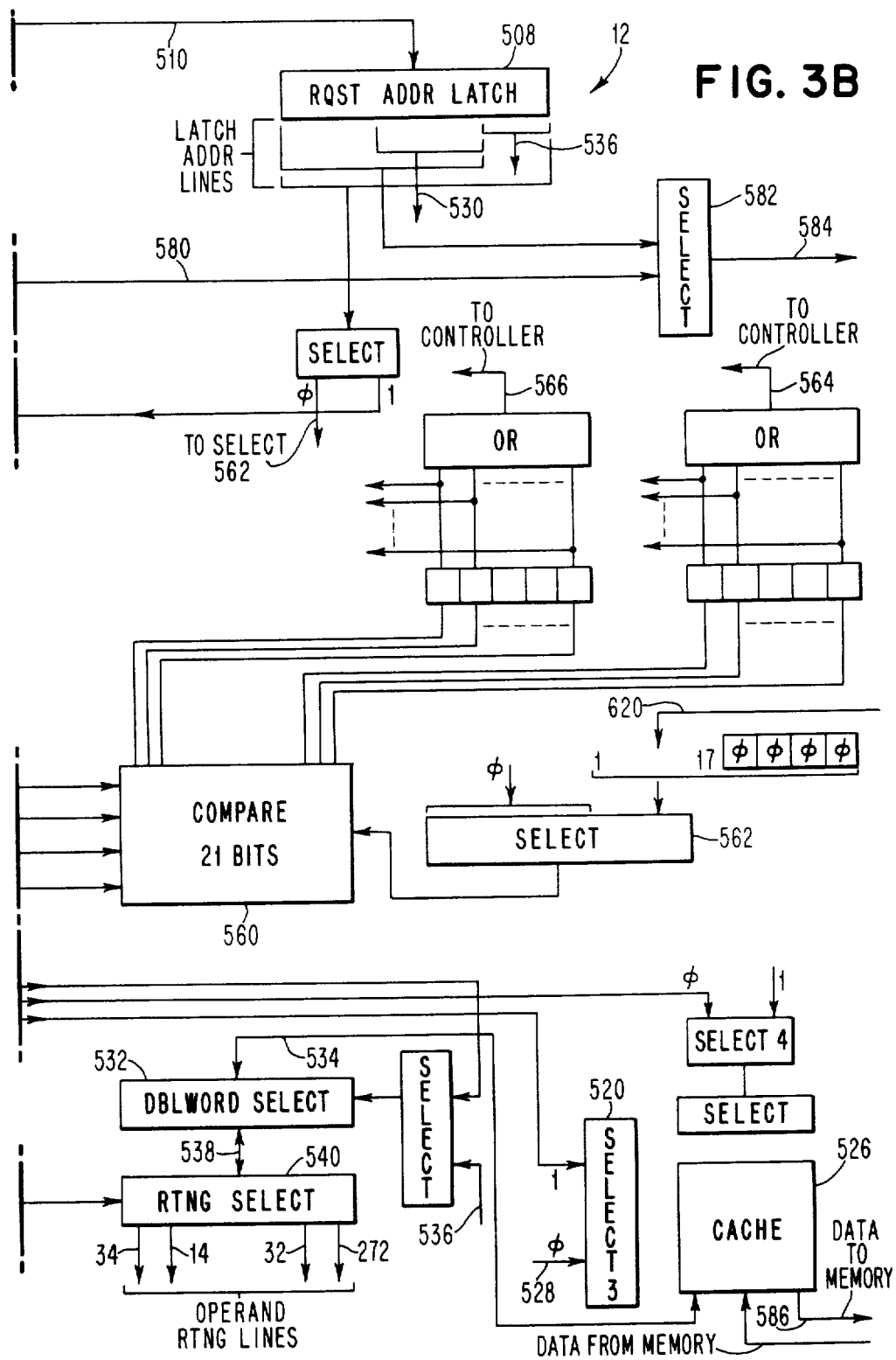

Referring now to FIGS. 3A, 3B and 8, the PSU 12 will be described as it relates to the operation of the LCBAU 20.

PSU 12 functions under the control of PSU controller 502 which accepts PSU service requests from the E-unit, the I-unit and the LCBA unit and the purge signal from the LCBA unit. PSU controller 502 operates under microprogram control in accordance with the flowchart set out in detail in FIG. 8. When a service request is received by controller 502, the first test is whether there is any pending service request to the PSU. If there is, the busy flags are tested to determine if there are free registers in the PSU for handling an additional request. The service request vector is then read to determine the source of the request and the nature of the request. For example, in a 6-bit vector, if the low order bit is set the request is from the LCBAU and it has the lowest priority of access to the PSU. If the next bit is set, the request is from the I-unit and has a next higher priority then that LCBAU. If the third bit is set, the request is a fetch request from the E-unit and if the fourth bit is set, the request is a store request from the E-unit. Bit 5 of the service request vector indicates a service request from main memory and bit 6, if set, indicates a purge command from the L-unit as has been described above.

When the service request vector has been decoded, a priority select signal is transmitted to select request address multiplexer 504 on line 506. The selected 21 bit address signal is then transmitted to the request address latch 508 on bus 510 and the high order 17-bits of the address are transmitted to directory 512 on bus 514. The directory compares the 17-bits of the request address with the addresses of data stored in cache to determine whether the requested address is in cache (HIT) or if the requested address is not in cache (MISS). The structure of the address used with the apparatus according to the present invention is shown below.

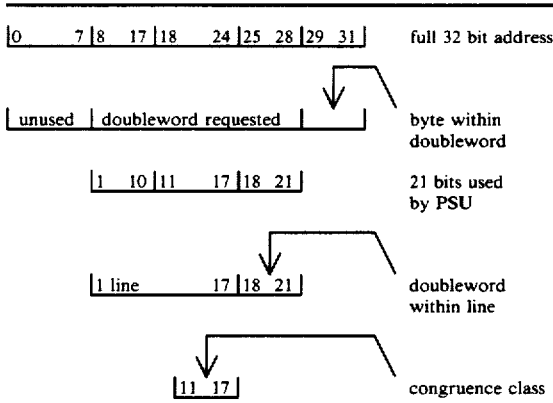

The full address as shown on line A includes 32 bits which were the purposes of the present invention, are divided as follows:

Bits 0-7 are not used;

Bits 29,30 and 31, the low order bits, identify a byte within a double word and for purposes of the present embodiment are not used;

Bits 8-28 inclusive are renumbered as shown on line C as bits 1-21 wherein bits 1-17 identify a particular line in memory and bits 18-21 identify 1 of 16 doublewords within a line.

For the purposes of further description, the address bits will be referred to as defined by example C above.

If the directory 512 raises the hit line 516, indicating that the requested address is in cache, the replace set select 2, 518, cache set access select 3, 520, and cache congruence class (CCC) access, select 4, 522, are all set to zero. Replace set line 524 containing a 2-bit set code identifying one of four sets in cache 526 is transmitted on lines 528 through cache set access 520 to cache 526. Concurrently, bits 11 to 17 of the latched request address from request address latch 508 containing the congruence class information are transmitted on lines 530 to cache 526 through cache congruence class access 522.

If cache 526 is considered as a matrix having 128 columns or congruence classes and four rows or sets, the concurrent selection of one of four sets of cache set access 520 and one of 128 congruence classes from cache congruence class access 522 results in selection of a line of data which is transferred from cache 526 to doubleword select gates 532 on lines 534. On a hit, bits 18 to 21 of request address latch 508 are transmitted on lines 536 to doubleword select word gates 532 to select one of 16 doublewords which are then transmitted on operand transfer lines 538 to routing select gates 540. Operand routing flags on lines 542 which are raised by PSU controller 502 in accordance with the request being serviced, places the operand doubleword on the appropriate bus depending on the nature and the source of the request as follows:

An E-unit fetch causes the operand to be transmitted on bus 32 to E-unit 26;

An I-unit request causes the operand the be transmitted to I-unit 10 on bus 14, the E-unit 26 on bus 32 and/or the L-unit 20 on bus 34, as determined by the decoded instruction, and an L-unit request causes the operand to be transmitted to L-unit 20 on bus 34. If the request is an E-unit store, the operand is transmitted from E-unit 26 on bus 272 to routing select gates 540 which cause the operand to be stored in cache 526 at the address selected by the cache set access and cache congruence class access and the doubleword select as set forth above.

The operand routing select lines 542 are four-bit lines wherein the following protocol is observed:

A one in the high order bit selects a store from the E-unit;

A one in the second high order bit selects a fetch to the E-unit;

A one in the third bit causes a fetch to the I-unit and a one in the low order bit causes a fetch to the L-unit.

Handling of storage requests where the data is in cache resulting in a hit is relatively straightforward.

However, if directory 512 raises MISS line 544 indicating that the requested information is not in cache, the operation of PSU 12 becomes much more complex.

The request address from latches 508 is transmitted to request data register select (RDR) 546 on lines 548. The set select from replace set select 2 518 is transmitted to RDR select 546 in lines 550. The four-bit routing flags from PSU controller 502 are transmitted to RDR select 546 on lines 552 and 554.

RDR select 546 is activated by PSU controller 502 raising the RDR in select line 556 which gates the select information in RDR select 546 to the request data registers 558. A compare is next made in compare 560 to determine if the requested address has already been missed and requested from main storage by comparing requested address from address select 562 with the address from RDR 558. If the currently requested line address has been recently requested and missed, line 564 "any equal 1:17" will be raised to PSU controller 502 indicating a recent miss which need not be rerequested at the present time.

Similarly, if the specific doubleword currently requested as indicated by the address from address select 562 is equal to a doubleword address currently in RDR 558, line 566 will be raised indicating that the requested doubleword has been recently requested as need not be rerequested at the present time.

Outstanding requests are possible due to unsatisfied prefetches from another unit in the system. If either line 564 or 566 is raised to PSU controller 502, and internal register is set to 1 to inhibit a further fetch of the current request, only 1 of address equal compare lines 566 can be active at a given time. If line 566 is active, a specific doubleword is found whereas if line 564 is active a line is found and the doubleword within the line must be further specified.

If line 566 is active, indicating that the doubleword has been found, RDR in select line 566 and RDR out select line 568 are raised. The four-bit routing code from RDR output select gates 570 are gated to routing OR 574 on RTNGORIN 1 line 572 where it is ORed with RTNGORIN 2 on line 576 from PSU controller 502. The output 554 of ROUTING OR 574 is then gated back to RDR select IN 546 to select the RDR routing when RDR in select line 556 is raised. At this point, PSU 12 is free to accept additional requests.

If there is no compare equal on line 566, indicating that there was no previous request for the specified doubleword, then the PSU controller finds a free request data register and sets RDR select in gates 546 to select the free register. The selected request data register is marked busy. The routing information, set and address are then gated into the three fields of the selected data register in RDR 558.

If a compare equal signal appeared on line 564 indicating that the requested line has been recently previously requested, then PSU 12 is free to accept additional requests. If not, processing of the new request continues.

Figure 4:
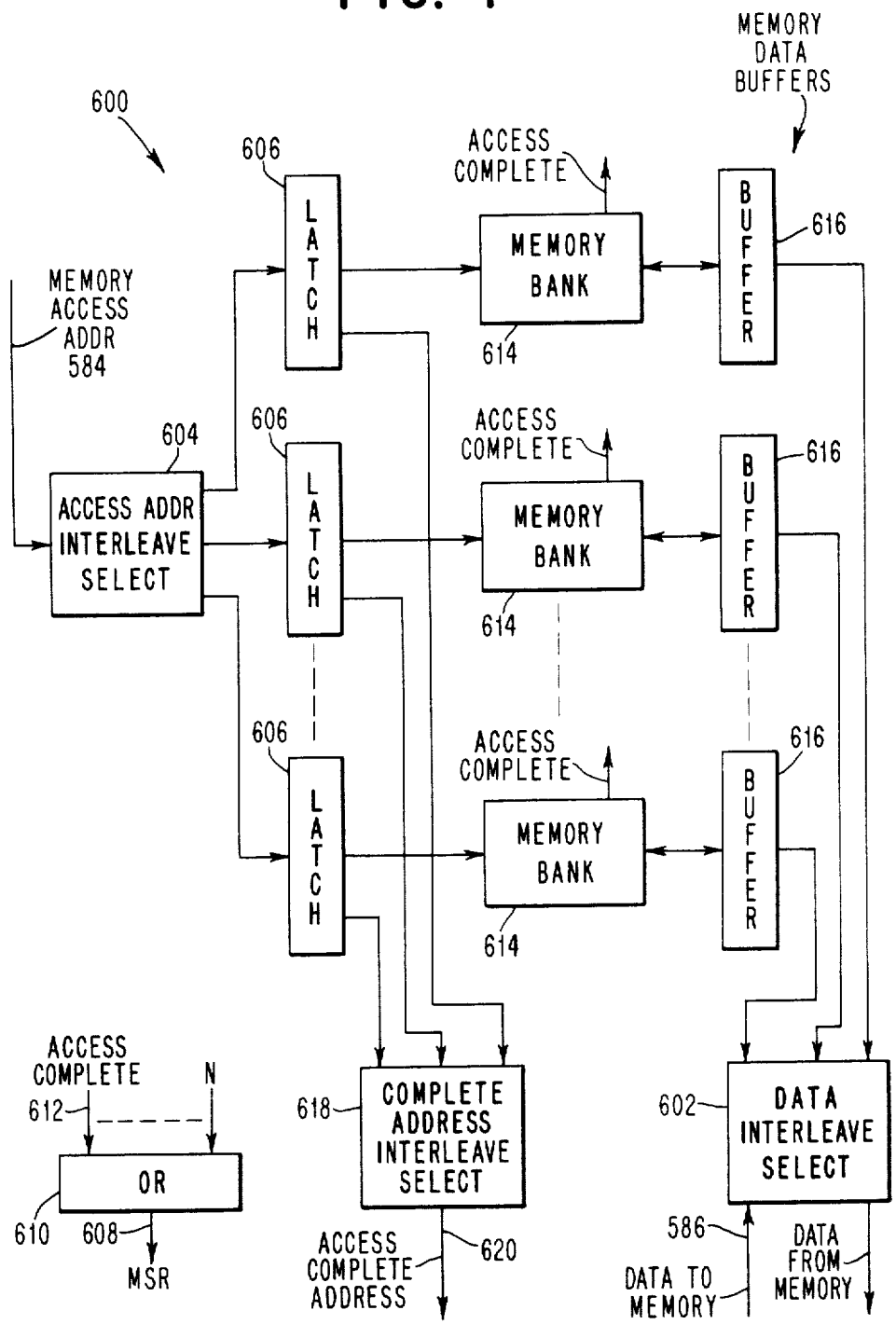
FIG. 4 is a block diagram of an interleaved main memory according to the present invention for use of the Processor Storage Unit shown in FIG. 3.

If existing data in a set has been changed, the new data must be written to memory before being replaced to insure that main memory and cache have identical data at the respective addresses. Directory 512 raises castout required line 578 when initially checking the request address for a HIT or a MISS. The castout address bits 1-17 are transmitted on lines 580 through memory access address select 582 on bus 584 to main memory 600 (see FIG. 4). The current value of the I Register in the PSU controller 502 is set into the RDR OUT select gates 570.

RDR OUT set bits are sent into cache set access 520 when RDR OUT select line 568 is raised. RDR output congruence class bits are set into cache congruence class access 522 at the same time. The data from cache 526 to memory 600 is then transmitted on data bus 586 to memory multiplexer 602. The 17-bit address on lines 584 are propagated through access address interleave select multiplexer 604 to one of interleave address latches 606.

PSU 12 is now free to accept additional requests.

Referring again to FIG. 8A, if the read service request vector indicates that the second highest order bit is active, a memory service request is indicated. On a transfer of data from main memory 600 to PSU 12, the MSR line 608 is raised when OR gate 610 has an access complete line 612 active on any of the interleaved inputs. Access complete lines 612 are raised on completion of access of any of memory banks 614 when the access has been completed and the data has been transferred to memory data buffers 616. The access complete address is presented on BUSES 620 from access complete address multiplexer 618. This 17-bit address is then sent to compare 560 where it is compared with addresses from RDR 558. Four zeros are appended to the low order portion of the access complete address so that a 21-bit address compare can be made by compare 560. If doubleword compare equal line 564 is raised, the data line stored latch is tested.

If data line stored equals 1, the RDR address doubleword select bits 18-21 are set into doubleword select gates 532 when RDR out select line 568 is raised. The RDR routing is set into routing select 540 when the RDR out select line 568 is raised. At this point, the cache data at the selected address is gated onto the appropriate operand bus in accordance with the selected routing. The request data register is marked free by the PSU controller.

The above description of the operation of PSU 12 together with main memory 600 shows an implementation at an architectural level which would be readily understood by those skilled in the art. It should be further pointed out, that PSU controller 502 may be implemented by a microprogram control device similar to that shown for LCBAU 20 in FIG. 2.1 described above.

The apparatus described improves the speed of operation of a processor employing a multilevel memory structure including a high speed cache.

The above description has been directed primarily to cache and main memory accesses and data fetches and stores.

If a new LCBA instruction appears in the instruction stream, purge line 28 is raised by LCBAU 20 which causes purge LCBA routing line 598 to be raised which gates zeros into LCBA routing flag register 596. This causes any "route to LCBA" flag in any of the requested data registers, the low order bit of the four-bit routing field, to be set to zero. The purge line does not affect requests from units other than the LCBA.

Although the present invention has been described with reference to a preferred embodiment thereof, it will be apparent to those skilled in the art that various changes in detail may be made within the scope of the invention.

Having thus described my invention, what I claim as new and desire to secure by Letters Patent is:

1. In a digital data processing system which processes control blocks of information including data and instructions, and having an Instruction unit for decoding said instructions, an Execute unit for executing said instructions and a multilevel storage system, said storage system further comprising a main memory wherein said control blocks of information are stored at designated addresses, a cache memory which stores selected

13 ones of said control blocks of information transferred from said main memory, and a storage control unit for controlling the transfer of selected ones of said control blocks of information between said main memory and said cache memory, the improvement comprising:

a control block address prefetch unit connected to said Instruction unit for receiving a control signal in response to said Instruction unit decoding a predetermined instruction in a given control block of information, and also connected to said storage control unit for receiving the address of said given control block of information presently being processed by said data processing system, said prefetch unit utilizing said control signal and said address of said given control block of information to compute the address of a different control block of information in said main memory, and including means for prefetching said different control block of information to said cache memory for subsequent processing, concurrent with said given control block of information being processed by said data processing system.

2. Apparatus according to claim 1, wherein said control block address prefetch unit further comprises a microprogrammed controller, a plurality of operand registers, an address adder, an effective address register and an operand zero detector.

3. Apparatus according to claim 2, wherein said operand zero detector is connected to one of said operand registers to generate a stop signal when the contents of said operand register are zero.

4. In a digital processing system which processes control blocks of information including data and instructions, which instructions include a load control block address instruction, and having an Instruction unit for decoding said instructions, an Execute unit for executing said instructions and a multilevel storage system, said storage system further comprising a main memory wherein said control blocks of information are stored at designated addresses, a cache memory which stores selected ones of said control blocks of information transferred from said main memory, and a storage control unit for controlling the transfer of selected ones of said control blocks of information between said main memory and said cache memory, the improvement comprising:

a load control block address unit connected to said instruction unit for receiving and offset signal in response to said instruction unit decoding said load control block address instruction from a given control block of information being presently processed by said data processing system, and also connected to said storage control unit for receiving the address of said given control block of information, said load control block address unit combining said offset signal and said address of said given control block of information to compute the address of at least one different control block of information in said main memory, and including means for prefetching said different control block of information to said cache memory from said main memory for subsequent processing, concurrent with said given control block of information being processed by said data processing system.

5. The combination claimed in claim 4 wherein said load control block address unit includes:

a first register to store said offset signal;

14 a second register for storing the address of said given control block of information; and an adder for adding the contents of said first and second registers to provide the address of said different control block of information.

6. In a digital processing system which processes control blocks of information including data and instructions, which instructions include a prefetch instruction, and having an Instruction unit for decoding said instructions, an Execute unit for executing said instructions and a multilevel storage system, said storage system further comprising a main memory wherein said control blocks of information are stored in a linked list at designated addresses at non contiguous memory locations, a cache memory which stores selected ones of said control blocks of information transferred from said main memory, and a storage control unit for controlling the transfer of selected ones of said control blocks of information between said main memory and said cache memory, the improvement comprising:

a control block address prefetch unit connected to said instruction unit for receiving an offset signal in response to said instruction unit decoding said prefetch instruction from a given control block of information being presently processed by said data processing system, and also connected to said storage control unit for receiving the address of said given control block of information, said prefetch unit combining said offset signal and said address of said given control block of information to compute the address of the next control block of information in said linked list in said main memory, and including means for prefetching said next control block of information to said cache memory from said main memory for subsequent processing, concurrent with said given control block of information being processed by said data processing system.

7. In a digital processing system which processes a linked list of control blocks of information including data and instructions, which instructions include a prefetch instruction, and having an instruction unit for decoding said instructions, an Execute unit for executing said instructions, and a multilevel storage system, said storage system further comprising a main memory wherein said linked list of control blocks of information are stored at designated addresses at non contiguous memory locations, a cache memory which stores selected ones of said control blocks of information transferred from said main memory, and a storage control unit for controlling the transfer of selected ones of said control blocks of information between said main memory and said cache memory, and a control block address prefetch unit connected to said Instruction unit and said storage control unit, a method of prefetching a subsequent control block of information to said cache memory from main memory concurrent with a given control block of information being processed by said data processing system, said method comprising the steps of:

providing an offset signal to said control block address prefetch unit in response to said Instruction unit decoding said prefetch instruction in said given control block of information;

providing at least a portion of the address of said given control block of information to said control block address prefetch unit from said storage control unit in response to the decoding of said prefetch instruction;

computing the address of a subsequent control block of information in said linked list of information by said control block address prefetch unit in response to combining said offset signal and said at least a portion of the address of said given control block of information; and responding to the generation of said address of said subsequent control block of information by said storage control unit to transfer said subsequent control block of information from main memory to cache memory, concurrent with said given control block of information being processed by said data processing system.

8. In a digital processing system which processes a linked list of control blocks of information including data and instructions, which instructions include a load control block address instruction, and having an instruction unit for decoding said instructions, an Execute unit for executing said instructions, and a multilevel storage system, said storage system further comprising a main memory wherein said linked list of control blocks of information are stored at designated addresses, a cache memory which stores selected ones of said control blocks of information transferred from said main memory, and a storage control unit for controlling the transfer of selected ones of said control blocks of information between said main memory and said cache memory, and a load control block address unit connected to said Instruction unit and said storage control unit, a method of prefetching a subsequent control block of information in said linked list to said cache memory from main memory concurrent with a given control block of information being processed by said data processing system, said method comprising the steps of:

providing an offset signal to said load control block address unit in response to said Instruction unit decoding said load control block instruction in said given control block of information;

providing at least a portion of the address of said given control block of information to said load control block address unit from said storage control unit in response to the decoding of said prefetch instruction;

computing the effective address of the next control block of information in said linked list of information by said load control block address unit in response to adding said offset signal to said at least a portion of the address of said given control block of information; and responding to the generation of said effective address of said next control block of information by said storage control unit to transfer said next control block of information from main memory to cache memory, concurrent with said given control block of information being processed by said data processing system.

* * * * *